United States Patent
Sailer et al.

(10) Patent No.: US 10,778,538 B2
(45) Date of Patent: Sep. 15, 2020

(54) AUTOMATED SELF-RECOVERY OF DISTRIBUTED SERVICES

(71) Applicant: INTERNATIONAL BUSINESS MACHINES CORPORATION, Armonk, NY (US)

(72) Inventors: Anca Sailer, Scarsdale, NY (US); Tian Cheng Liu, Beijing (CN); Yichong Yu, Yorktown Heights, NY (US); Shubir Kapoor, Yorktown Heights, NY (US); Bo Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 16/141,158

(22) Filed: Sep. 25, 2018

(65) Prior Publication Data

US 2020/0099593 A1    Mar. 26, 2020

(51) Int. Cl.
| | | |
|---|---|---|
| *H04L 12/24* | (2006.01) | |
| *G06F 11/00* | (2006.01) | |
| *G06F 11/07* | (2006.01) | |
| *H04L 12/911* | (2013.01) | |

(52) U.S. Cl.
CPC ........ *H04L 41/5025* (2013.01); *G06F 11/008* (2013.01); *G06F 11/0709* (2013.01); *G06F 11/0793* (2013.01); *H04L 41/5035* (2013.01); *H04L 41/5096* (2013.01); *H04L 47/74* (2013.01)

(58) Field of Classification Search
CPC . H04L 41/5025; H04L 47/74; H04L 41/5096; H04L 41/5035; G06F 11/0793; G06F 11/008; G06F 11/0709
See application file for complete search history.

(56) References Cited

U.S. PATENT DOCUMENTS

| | | |
|---|---|---|
| 8,930,770 B2 | 1/2015 | Stanko et al. |
| 9,740,546 B2 | 8/2017 | Nagesharao et al. |
| 9,785,521 B2 | 10/2017 | Lightner et al. |
| 10,275,326 B1 * | 4/2019 | Stickle ............... G06F 11/2002 |

(Continued)

OTHER PUBLICATIONS

Arshad, Naveed, et al. "A planning based approach to failure recovery in distributed systems," Proceedings of the 1st ACM SIGSOFT workshop on Self-managed systems, Oct. 2004, pp. 8-12, ACM.

(Continued)

*Primary Examiner* — Kim T Nguyen
(74) *Attorney, Agent, or Firm* — Tutunijan & Bitetto, P.C.; Joseph Petrokaitis

(57) ABSTRACT

Computer-implemented methods, computer program products and systems for automated self-recovery of a distributed service are disclosed. In embodiments, a missing resource of the service is determined based on a pre-defined service description responsive to a detection of a failure of the service. The service description defines base elements for recovering the service. A recovery strategy is further generated based on the missing resource in accordance with inference rules. A resource is further retrieved from a pool in accordance with the recovery strategy and based on the retrieved resource, the service is further recovered in accordance with the recovery strategy.

21 Claims, 5 Drawing Sheets

(56) References Cited

U.S. PATENT DOCUMENTS

2014/0237121 A1* 8/2014 Phanse ................ G06F 11/2023
                                                          709/226
2016/0036671 A1* 2/2016 Sadovsky ........... H04L 41/5032
                                                          709/224
2016/0371135 A1   12/2016 Sarkar et al.
2017/0286208 A1   10/2017 Hives et al.

OTHER PUBLICATIONS

Ruscio, Joseph F., et al. "Dejavu: Transparent user-level checkpointing, migration, and recovery for distributed systems," Parallel and Distributed Processing Symposium, Mar. 2007, pp. 1-10, IEEE International. IEEE.

* cited by examiner

FIG. 1
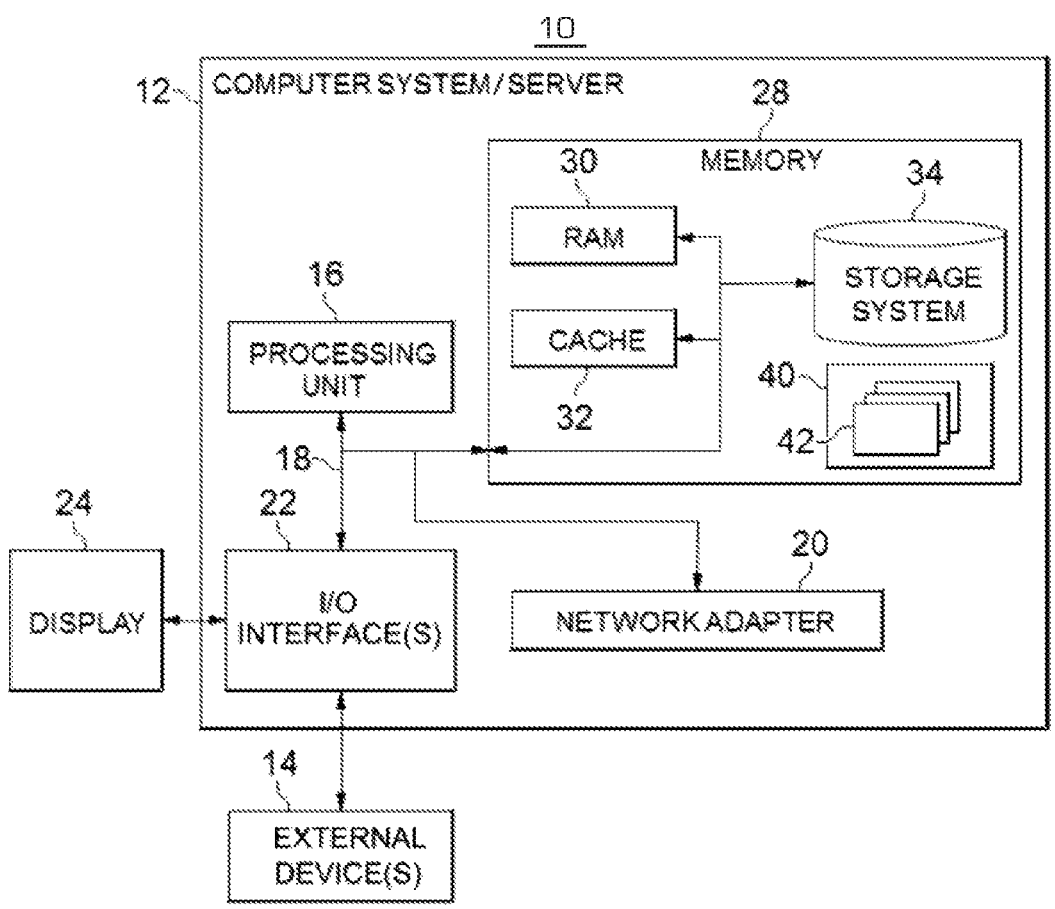
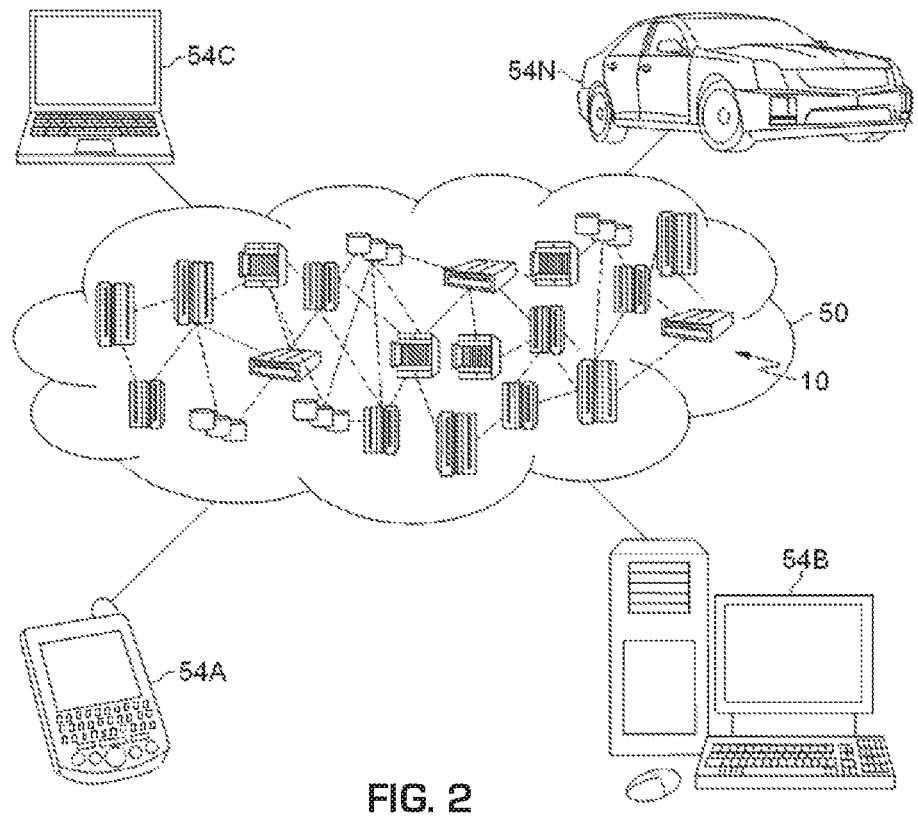
FIG. 2

AUTOMATED SELF-RECOVERY OF DISTRIBUTED SERVICES

BACKGROUND

Technical Field

The present application generally relates to improved distributed computing, and more specifically, to methods, systems and computer program products for automated self-recovery of distributed services.

Description of the Related Art

Distributed computing is a coordinated use of many computers disbursed over a wide area to do complex tasks. A distributed system is a system whose components are located on different networked computers, which can communicate and coordinate their actions by passing messages to each other. The components interact with each other to achieve a common goal. Cloud computing is an example of distributed computing. A service run within a distributed system is referred to a distributed service.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment of the present invention, there is provided a computer implemented method for automated self-recovery of a distributed service in which at least one missing resource of the service is determined based on a pre-defined service description responsive to a detection of a failure of the service, wherein the service description defines base elements for recovering the service. A recovery strategy is further generated based on the at least one missing resource in accordance with at least one inference rule. At least one resource is further retrieved from a pool in accordance with the recovery strategy and based on the retrieved at least one resource, the service is further recovered in accordance with the recovery strategy.

Other embodiments and aspects, including but not limited to, computer systems and computer program products, are described in detail herein and are considered a part of the claimed invention.

These and other features and advantages of the present invention will be described in, or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure:

FIG. 1 depicts a cloud computing node according to an embodiment of the present invention;

FIG. 2 depicts a cloud computing environment according to an embodiment of the present invention;

DETAILED DESCRIPTION

Figure 3:
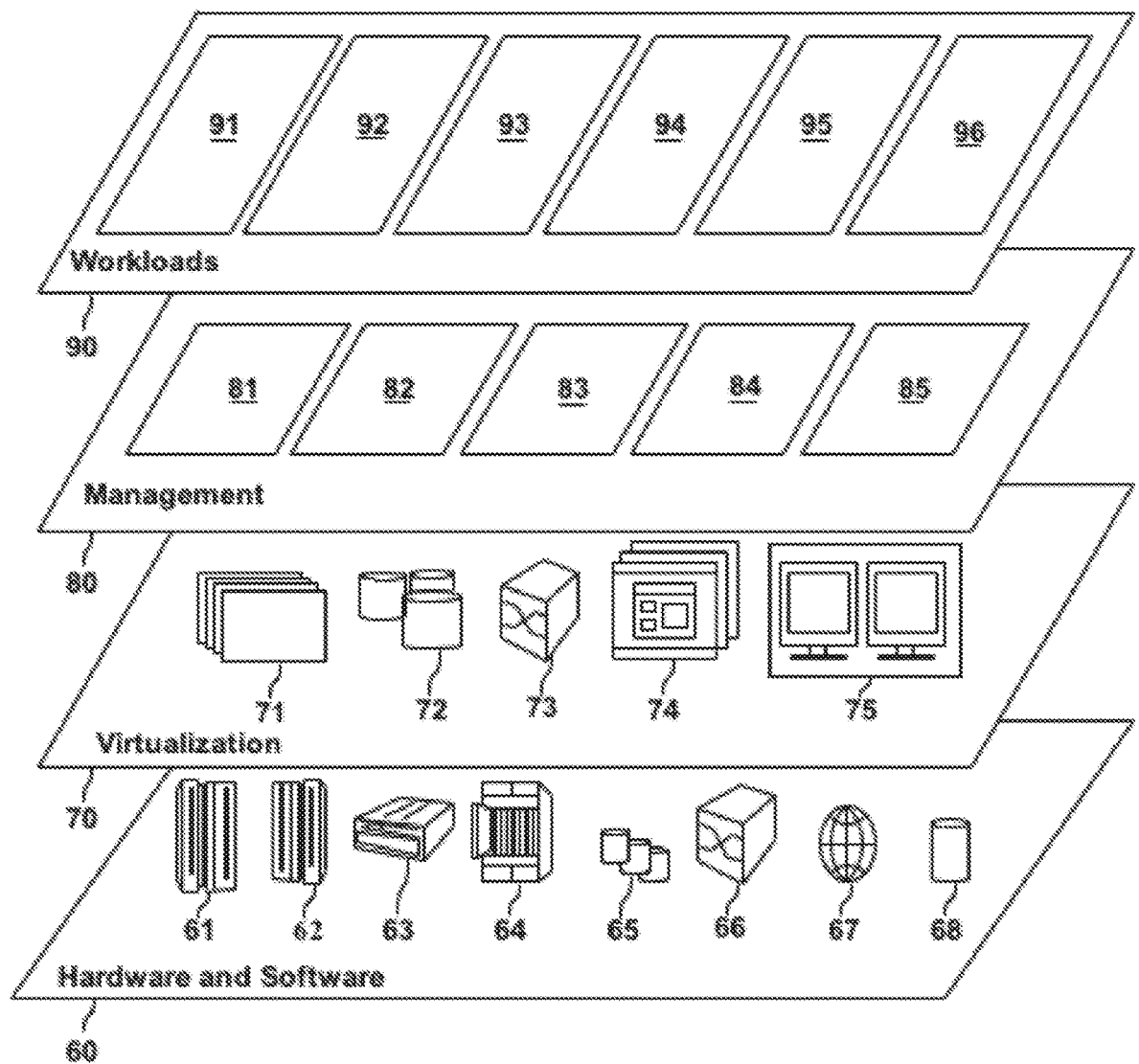
FIG. 3 depicts abstraction model layers according to an embodiment of the present invention.

Some embodiments will be described in more detail with reference to the accompanying drawings, in which the embodiments of the present invention have been illustrated. However, the present invention can be implemented in various manners, and thus should not be construed to be limited to the embodiments disclosed herein.

With the fast development of distributed computing technologies, more and more services nowadays have been deployed within distributed computing systems. A distributed service that runs within a distributed system typically includes multiple components that run on different computing nodes. As there are myriad requirements and dependences among the multiple components of a distributed service, automated self-recovery of the service is typically a very challenging task. Moreover, failure scenarios of a distributed service are usually unpredictable and hence cannot be easily foreseen. Therefore, existing approaches for recovery of a distributed service are highly manual and typically associated with considerable downtime.

Embodiments of the present invention can be deployed on cloud computer systems which will be described below. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service automated self-recovery 96 according to embodiments of the invention.

Figure 4:
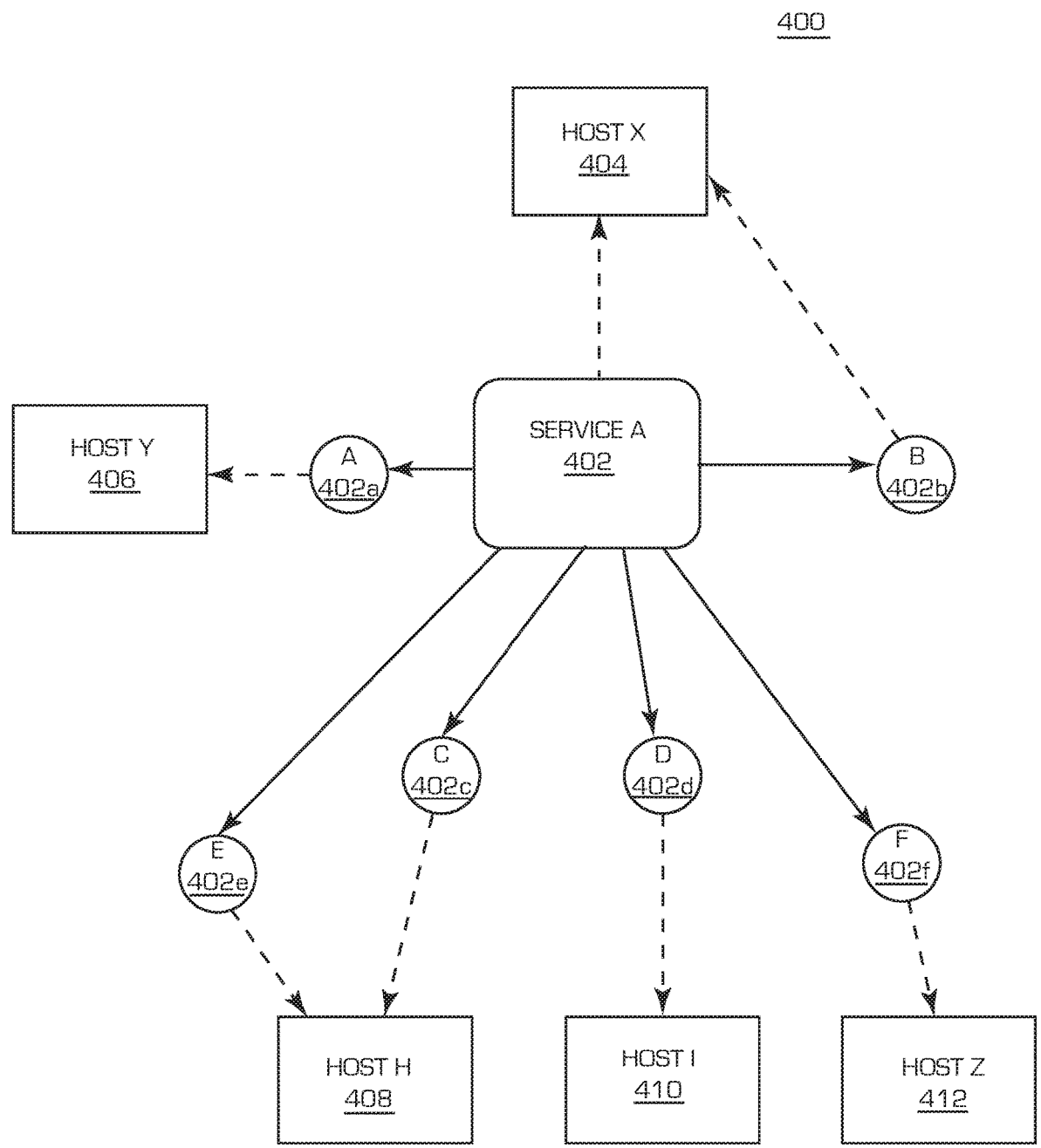
FIG. 4 illustrates a structural diagram 400 of an exemplary distributed service according to an embodiment of the present invention.

Referring now to FIG. 4, which illustrates a structural diagram 400 of an exemplary distributed service 'Service A' 402 according to an embodiment of the present invention. As shown in FIG. 4, Service A 402 that runs on Host X 404 is composed of Component A 402a that runs on Host Y 406, Component B 402b that also runs on Host X 404, Component C 402c and Component E 402e that run on Host H 408, Component D 402d that runs on Host I 410 and Component F 402f that runs on Host Z 412. In the following, the term 'resource' will be used to refer to any constitutive part of a distributed service, e.g., components that the service includes, or computing nodes that the service runs on, etc. It should be pointed out that the distributed service A 402 here is merely an example and only for the purpose of simplified illustration. It should not adversely limit the scope of the invention.

Malfunctions of any resources, e.g., any component(s) of Service A 402 or any host(s) that the components of Service A 402 run on, may result in a failure of Service A 402, for example, Component A 402a encounters a runtime error such as insufficient system memory or Host I 410 is down due to certain reasons. In existing service recovery schemes, when a service failure is detected, a "rollback" operation is typically executed, wherein a previous state of the service with all modifications, recorded in sufficient detail, is restored by reversing all the changes made since the previous state, or a "restore" operation utilizing a recovery checkpoint (e.g., a file system-based snapshot). As described above, such recovery schemes usually are highly manual and associated with considerable downtime. Different from existing approaches, embodiments of the invention provide highly automated self-recovery approaches which will be described in detail below with references to FIGS. 5 and 6.

Figure 5:
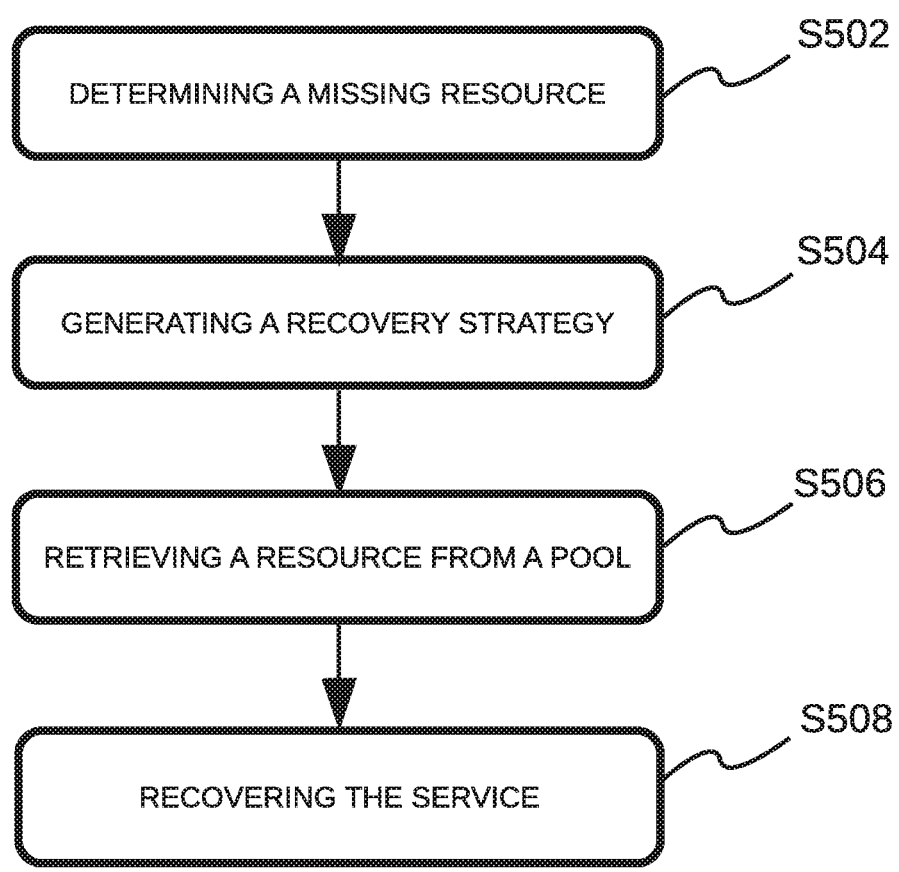
FIG. 5 illustrates an exemplary method 500 according to an embodiment of the present invention.

Now referring to FIG. 5 which illustrates an exemplary method 500 for automated self-recovery of a distributed service, e.g., Service A 402, according to an embodiment of the invention. The method 500 starts at block S502 in which at least one missing resource of the distributed service is determined responsive to a detection of a failure of the service. The determination of the at least one missing resource is based on a pre-defined service description, which defines base elements for recovering the service. According to an embodiment of the invention, the service description may include at least one type of the following information: one or more topology definitions, one or more candidate resource definitions, one or more resource loose matching rules, one or more auxin definitions, status information and data recovery endpoint information, etc. It should be pointed out that the above-mentioned constitutive parts of the service description are merely an example, the service description may include fewer or more parts, as long as the service could be recovered with the service description.

In the following, the service description will be described with some examples with reference to Service A 402 in FIG. 4. However, it should be pointed out that the following description is merely for illustrative purpose, that is to say, the service description may be of any proper formats and/or include any contents as long as the service could be recovered with the service description. The following description should not adversely limit the scope of the invention.

Topology Definition

A topology definition defines the topology of the service. It typically includes resource topology information of the service, for example, components the service includes, hosts components of the service run on, relationships among different resources, etc. An example of a topology definition is presented in the following for a better understanding of the invention. However, it should be pointed out the example in the following is merely for illustrative purpose and should not adversely limit the scope of the invention.

```
{Topology: {
    Name: API-Platform,
    Version: 2.0,
    Id: app012345,
    Components: [
        {name: CASSANDRA, version: 3.0, id: c12345, type: NoSQL},
        {name: CSB, version: 1.5, id: c24680},
        {name: SIDECAR, version: 1.7, id: c33667},
        {name: ZUUL, version: 2.2, id: c23344},
        ......
        {name: EUREKA, version: 2.1, id: c56789}
    ]
    Hosts: [
        {name: Host-H, OS: CentOS 6.5, id: h78345, type: Linux},
        {name: Host-I, OS: Radhat 7.0, id: h29980, type: Linux},
        ......
        {name: Host-X, OS: Ubuntu 14.0, id: h66387, type: Linux}
    ]
    Relationship: [
        {type: Runs On, Source: c33667, Target: h78345, id: r23456},
        {type: Depends On, Source: c33667, Target: c56789, id: r87659},
        ......
        {type: Depends On, Source: c23344, Target: c56789, id: r98998},
        {type: Depends On, Source: c23344, Target: c56789, id: r667788},
    loose_matching: type}
```

```
]}
}
```

In the above examples, API-Platform is the name of Service A 402, with its version being 2.0 and identifier (ID) being app012345. Service A 402 includes resources (components that Service A 402 includes) named CASSANDRA, CSB, SIDECAR, ZUUL, and EUREKA, etc., corresponding respectively to Component A 402a to Component F 402f (not in order). Other information associated with the components (e.g., versions, identifiers, and types of the components) is also provide in the topology definition. Service A 402 further includes resources (hosts that components of Service A 402 run on) named Host-H, Host-I, and Host-X etc., corresponding respectively to Host X 404 to Host Z (not in order). Other information associated with the hosts (e.g., operating systems, identifiers, types of the hosts) is also provided in the topology definition. Besides, relationships among the resources of Service A 402 are also provided. For example, relationship with identifier r23456 indicates that the component with the identifier c33667 (Source: SIDECAR) runs on the host with identifier h78345 (Target: Host-H). Relationship with identifier r87659 indicates that the component with identifier c33667 (Source: SIDECAR) depends on the component with identifier c56788 (Target: EUREKA).

Candidate Resource Definition

A candidate resource definition is a general description of candidate resources in a resource pool which may be utilized for the automated self-recovery of the service. The candidate definition may include a list of resources in the pool with corresponding description provided. An example of a candidate resource definition is presented in the following for a better understanding of the invention. However, it should be pointed out that the example in the following is merely for illustrative purpose and should not adversely limit the scope of the invention.

```
{Resource: {
    Name: Cloud-A,
    Access_endpoint: https://whc-platform.com,
    Id: rc67891,
    Credential: xxxxxx,
    Updated_time: 2017-08-26,
    Toolechain: T778899,
    ResourceList: [
        {name: Redhat-tiny, type: VM, OS: Redhat, CPU: 1, Disk: 50G, Memory: 512M},
        {name: Redhat-small, type: VM, OS: Redhat, CPU: 2, Disk: 80G, Memory: 2G},
        ......
        {name: Redhat-large, type: VM, OS: Redhat, CPU: 8, Disk: 1T, Memory: 32G},
        {name: WAS-liberty, type: Service1, Service2, Plan: Free, Price: 0},
        ......
        {name: Cloudant, type: Service, Plan: A, Price: 10},
        {name: Oaky, type: Service, Plan: A, Price: 10},
    ]
  }
}
```

In the above examples, a resource pool with the name Cloud_A, the identifier rc67891, access endpoint https://wht-platform.com provides candidate resources defined in the ResourceList field. For example, a candidate resource named redhat-tiny is a VM type resource with 1 CPU, 50 G disk, 512M memory running a Redhat operating system.

Other information associated with the candidate resource is also provided in the candidate resource definition, e.g., the credentials to access the resources.

Loose Matching Rule

A loose matching rule defines a rule to locate available resources in the resource pool with at least one loose matching criteria. The utilization of loose matching criteria is to maximize the successful possibilities of the automated self-recovery of the service. An example of a loose matching rule is shown in the following for a better understanding of the invention. However, it should be pointed out that the example in the following is merely for illustrative purpose and should not adversely limit the scope of the invention. It should also be pointed out a strict matching rule could also be utilized according to an embodiment of the invention.

```
If loose Dependent on NoSQL for EUREKA Then
Return (Cloudant | MangoDB | Cassandra)
```

In the above examples, the loose matching rule indicates if component EUREKA is loose dependent on NoSQL, other than NoSQL itself, Cloudant, MangoDB or Cassandra may be returned as the candidate resource.

Auxin Definition

An auxin definition describes the definition for deployment, testing and configuration of the service. It typically includes scripts to configure and test the service to be self-recovered. An example of an auxin definition is shown in the following for a better understanding. However it should be pointed out that the example in the following is merely for illustrative purpose and should not adversely limit the scope of the invention.

```
{Auxin Script: {
  Name: Install,
  Component: c56789,
  Url_id: ch345,
  Credential: xxxxxx,
  Updated_time: 2017-08-26,
  Type: chef
},
{
  Name: Config,
  Component: c56789,
  Url: https://ucd.com/eureka/configuration,
  Id: ad556677,
  Credential: xxxxxx,
  Updated_time: 2017-08-26,
  Availability: True,
  Type: UCD-process
}
}
```

In the above examples, scripts to install and configure the component with identifier c56789, e.g., EUREKA, are defined in the auxin definition, with the necessary details, for example, the URL, credential, etc. provided.

Status Information

Status information describes the status of the resources of the service prior to the failure of the service. The status information includes basic status information of the resources of the service for the automated self-recovery of the service. Compared with existing approaches, the status information examples of the present invention only include very basic information, such as a name and version of a resource, and/or a configuration Universal Resource Identifier (URI) of the resource, etc. A complete state or all modifications in a previous state of the service is not needed.

An example of status information is shown in the following for a better understanding of the invention. However, it should be pointed out that the example in the following is merely for illustrative purpose and should not adversely limit the scope of the invention.

```
{Status: {
Name: API-Platform-Status,
Version: 2.0,
Id: st332211,
Update: 21-JUN-2017 09:30:00,
Components: [
    {name: CASSANDRA, version: 3.0, id: cs22345,
uri: 10.1.90.43:5001,
config_uri :https://git.whc.com/Cassandra-3.0/cs22345},
    {name: CSB, version: 1.5, id: cs56680, uri: 10.1.90.45:8001,
config_uri :https://git.whc.com/CSB-1.5/cs56680},
    {name: SIDECAR, version: 1.7, id: cs86667, uri: 10.1.90.77:61001,
config_uri :https://git.whc.com/ SIDECAR-1.7/cs86667},
    {name: ZUUL, version: 2.2, id: cs88399, uri: 10.1.90.78:8080,
config_uri :https://git.whc.com/ZUUL-2.2/cs88399},
    ......
    {name: EUREKA, version: 2.1, id: cs22289, uri: 10.1.90.77:51000,
config_uri :https://git.whc.com/EUREKA-2.1/cs22289}
]
Hosts: [
    {name: Host-H, OS: CentOS 6.5, id: h78345, type: Linux, IP:
10.1.90.77, credential:xxx,
config_uri :https://git.whc.com/CentOS-6,5/Host-H/h78345},
    ......
    {name: Host-X, OS: Ubuntu 14.0, id: h66387,
    type: Linux, 10.1.90.78,
credential:xxx, config_uri :https://git.whc.com/ Ubuntu-14.0/Host-X/
h66387}
]
}
}
```

In the above examples, status of the resources of the service prior to the failure of the service is recorded, wherein for example, the component CASSANDRA with status identifier cs22345 is with version 3.0, URI 10.1.90.43:5001 and config URI https://git.whc.com/Cassandra-3.0/cs22345.

Data Recovery Endpoint Information

Data recovery endpoint information describes the endpoints used to recover data for the automated self-recovery of the service. An example of data recover endpoint information is shown in the following for a better understanding of the invention. However, it should be pointed out that the example in the following is merely for illustrative purpose and should not adversely limit the scope of the invention.

```
{Data Recovery Endpoint: {
  Name: backup-DB,
  Id: DRE-101,
  Dbname: bkdb,
  Access_endpoint: http://bkdb.DRE.org:5001,
  Type: Cloudant,
  Credential : xxx,
  Update_timestamp : 23-JUN-2017 20:00:00
  }
}
```

In the above examples, the endpoint information for the data recovery is described in which for the type Cloudant, the data should be recovered from endpoint http://bkdb.DRE.org:5001 from the database named bkdb. Other information associated with the recovery of data, e.g., credential, update timestamp etc. is also provided.

Here it should be pointed out that the examples of the service description are merely for illustrative purpose. The information included in the service description may include fewer or more types of information, and each type of information may be in any proper formats.

With the service description, at least one missing resource may be determined by comparing the topology information defined in the topology definition in the service description and the actual topology of the service with a failure detected. For example, it will be very easy to determine the component CASSANDRA (with identifier c12345, version 3.0 and type NoSQL) is missing from the actual topology of failed service.

Then, the method 500 proceed to block S504 in which a recovery strategy is generated based on the at least one missing resource in accordance with at least one inference rule. An inference rule typically has a function which takes premises, analyzes their syntax and returns one or more conclusions. Examples of the inference rule are shown in the following for a better understanding. However, it should be pointed out that the example in the following is merely for illustrative purpose and should not adversely limit the scope of the invention.

---

Rule 1001.
If Health-Check(component, com_id_A) == false
&& Health-Check(component, com_id_B) == false
 Then: Check_Relationship(com_id_A, com_id_B)
Rule 1002.
If Check_Relationship(com_id_A, com_id_B) return DependsOn(com_id_A, com_id_B) Then:
 Recovery_chain = Recover(component, com_id_B) -> Recover(component, com_id_A)
  Return Recovery_chain
Rule 1003.
If Recover (component, com_id) Then:
 Recovery_chain = Restart(component, com_id) ?->: Check_Host(component, com_id) -> Install(com_id)
  Return Recovery_chain
Rule 1004.
If Restart (component, com_id) == false Then:
 Check_Host(component, com_id)
Rule 1005.
If Check_Host(component, com_id) return RunsOn(com_id, host_id) Then
 Recovery_chain = Health_Check(host, host_id) ?->: Recover(host, host_id) -> Recover(component, com_id)
  Return Recovery_chain
Rule 1006.
If Health_Check(host, host_id) == false Then:
 Recover(host, host_id)
Rule 1007.
If Recover(host, host_id) Then:
 Recovery_chain = Reboot(host_id) ?->: Provision(host, host_id)
  Return Recovery_chain
Rule 1008.
If Reboot(host, host_id) == false Then:
 Provision(host, host_id)
Rule 1009.
If Provision(host, host_id) == false Then:
 Return Failure

---

In the above examples, inference rules are defined so that a recovery strategy can be generated based on the at least one missing resource. For example, Rule 1001 defines if both the health checks of the component with identifier A and the component with identifier B return false, the relationship between the two components should be checked. Rule 1002 defines if the relationship between the above two components returns that the component with identifier A depends on the component with identifier B, the recovery chain should be in the order of recovering the component with identifier B first, then recovering the component with identifier A. The recovery chain generated (the component with identifier B should be recovered first and then the component with identifier A) is an example of the recovery strategy. An example of the recovery strategy is shown in the following for a better understanding in which two related components (the component with identifier c33667 and the component with identifier c56789) are detected as failure, however, it should be pointed out that the example in the following is merely for illustrative purpose and should not adversely limit the scope of the invention.

---

Inference rules applied
Rule 1001.
If Health-Check(component, c33667) == false && Health-Check(component, c56789) == false Then:
 Check_Relationship(c33667, c56789)
......
Rule 1002.
If DependsOn (c33667, c56789) Then:
 Then: Recovery_chain = Recover(component, c56789) -> Recover(component, c33667)
  Return Recovery_chain
......
Rule 1003.
If Recover (component, c56789) Then:
 Recovery_chain = Restart(component, c56789) ?->: Check_Host(c56789) -> Install(c56789)
  Return Recovery_chain
......
Rule 1005.
If RunsOn(c56789, h66387) Then
 Recovery_chain = Health_Check(host, h66387) ?->: Recover(host, h66387) -> Recover(component, c56789)
  Return Recovery_chain
......
Rule 1007.
If Recover(host, h66387) Then:
 Recovery_chain = Reboot(h66387) ?->: Provision(host, h66387)
  Return Recovery_chain
Recovery Strategy
...-> Restart(c56789) ?->: (Reboot(h66387) ?->: (Provision(h66387 )?->: Install(c56789))) ->
->Restart(c33667) ?->: (Reboot(h78345) ?->: (Provision(h78345 )-> Install(c33667))) ->...

---

In the above examples, the generated recovery strategy above shows the recovery chain, e.g., the sequence of the recovery operations to recover the at least one missing resource (the component with identifier c33667 and the component with identifier c56789) of the service. For example, the resource with identifier c56789 should be restarted first in the chain. After the restart, check if the resource with identifier c56789 has been recovered, and if yes, the resource with identifier c33667 should be restarted. If no, reboot the resource with identifier h66387 and restart the resource with identifier c56789, and then, check whether the resource with identifier c56789 has been recovered. If yes, the resource with identifier c33667 should be restarted. If no, provision the resource with identifier h66387 and install the resource with identifier c56789.

After the restart of the resource with identifier c33667, check if it has been recovered and if no, reboot the resource with identifier h78345 and restart the resource with identifier c33667, and then, check whether the resource with identifier c33667 has been recovered, and if no, provision the resource with identifier h78345 and install the resource with identifier c33667.

With the generation of the recovery strategy, the method 500 proceeds to block S506 in which at least one resource is retrieved in accordance with the generated recovery strategy from a resource pool described for example in the candidate resource definition in the service description as mentioned above. According to an embodiment of the invention, when retrieving the at least one resource from the pool, at least one loosing matching rule, described, for example, in the service description, as mentioned above, is utilized.

The method 500 then proceed to block S508 in which the service is self-recovered in accordance with the recover strategy based on the retrieved at least one resource. According to an embodiment of the invention, the self-recovery of the service may include orchestrating the deployment of the retrieved at least one resource with the remained workable resources in accordance with the recovery strategy. For the example, described above, e.g., the component with identifier c33667 and the component with identifier c56789 are detected as having failed. the recovery strategy describes the recovery chain. In accordance with the generated recovery strategy, the deployment of the retrieved at least one resource (corresponding to the component with identifier c33667 and the component with identifier c56789) with the remaining workable resources is orchestrated, for example, in accordance with the auxin definition described in the service description.

According to an embodiment of the invention, the self-recovery of the service may further include constructing the dependencies among the retrieved at least one resource (corresponding to the component with identifier c33667 and the component with identifier c56789 in the above-mentioned example) and the remained workable resources in accordance with the recovery strategy.

According to an embodiment of the invention, the self-recovery of the service may further include restoring configurations and status of the service in accordance with the recovery strategy. The configurations and status may be restored, for example, in accordance with the status information described in the service description, as described above. Further, according to an embodiment of the invention, the self-recovery of the service may include restoring data of the service in accordance with the recovery strategy. The data may be restored, for example, in accordance with the data recovery endpoint information described above with respect to the service description.

According to an embodiment of the invention, an incubator may be initialized from remaining workable resources of the service responsive to the determination of the at least one missing resource. According to an embodiment of the invention, the retrieved at least one resource is added to the incubator responsive to its retrieval. The incubator functions as an isolator to block all access to the failed service, and thus provides a quarantined environment for automated self-recovery of the failed service. According to an embodiment of the invention, all following access to the failed service since the failure may be redirected to a backup to maintain the continuity of the service, and all associated data may be recorded accordingly so that after the automated self-recovery, the associated data may be together recovered.

Here, it should be pointed out the orchestration of the resources, the construction of the dependencies, the restoration of the configurations and status and data may utilize any existing approaches, and the details will not be discussed for the purpose of simplification.

Figure 6:
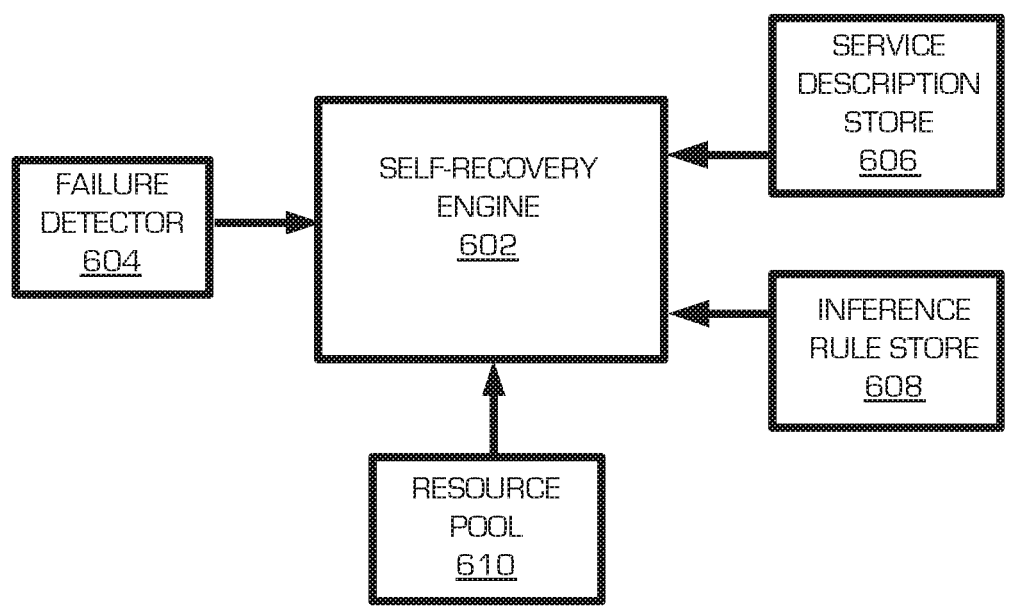
FIG. 6 illustrates an exemplary system 600 according to an embodiment of the present invention.

In the following, embodiments of the present invention will be further described with reference to FIG. 6 which illustrates an exemplary system 600 according to an embodiment of the present invention. The exemplary system 600 for automated self-recovery of a distributed service includes a Self-recovery Engine 602, a Failure Detector 604, a Service Description Store 606, an Inference Rule Store 608 and a Resource Pool 610. The Failure Detector 604 may be any existing module used for monitoring the health of the service. It may be included in the service monitoring functionalities. The Service Description Store 606 stores the service description, as described above. The Inference Rule Store 608 stores inference rules described above. The Resource Pool 610 is a pool of candidate resources so that when the service encounters a resource failure, it can be recovered using the candidate resources in the pool.

Responsive to a detection of a failure of the distributed service by the Failure Detector 602 of the system 600, the Self-recovery Engine 602 is invoked and the automated self-recovery in accordance with embodiments of the invention discussed above will be executed. The Self-recovery Engine 602 reads the service description in the Service Description Store 606 and determines at least one missing resource of the failed service. At least one inference rule is then read from the Inference Rule Store 608 and, in accordance with which, a recovery strategy is generated based on the at least one missing resource. Hence, at least one resource is retrieved from the Resource Pool 610 in accordance with the generated recovery strategy. With the retrieved at least one resource, the service may be further self-recovered in accordance with the generated strategy. The procedures of the self-recovery of the failed service are similar to what have been described above with reference to FIG. 5, thus will not be discussed in detail for the purpose of simplification.

According to an embodiment of the invention, an incubator may be initialized by the Self-recovery Engine 602 from remained workable resources of the service responsive to the determination of the at least one missing resource. According to an embodiment of the invention, the retrieved at least one resource is added to the incubator by the Self-recovery Engine 602 responsive to its retrieval. The incubator functions as an isolator to block all access to the failed service, thus providing a quarantined environment for automated self-recovery of the failed service. According to an embodiment of the invention, all following access to the failed service since the failure may be redirected to a backup to maintain the continuity of the service, and all associated data may be recorded accordingly so that after the automated self-recovery, the associated data may be together recovered.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for automated recovery of a distributed service, comprising:
   determining, by one or more processing units, at least one missing resource of the distributed service based on a pre-defined service description responsive to a detection of a failure of the distributed service, wherein the pre-defined service description defines base elements for recovering the distributed service;
   generating, by one or more processing units, a recovery strategy based on the at least one missing resource;
   retrieving, by one or more processing units, at least one resource in accordance with the recovery strategy; and
   recovering, by one or more processing units, the distributed service based on the retrieved at least one resource in accordance with the recovery strategy.

2. The method of claim 1, further comprising: initializing, by one or more processing units, an incubator from remaining resources of the distributed service responsive to the determination of the at least one missing resource of the distributed service.

3. The method of claim 2, further comprising: adding, by one or more processing units, the retrieved at least one resource to the incubator responsive to the retrieval of the at least one resource.

4. The method of claim 2, wherein the recovery of the distributed service comprises: orchestrating, by one or more processing units, deployment of the retrieved at least one resource with the remaining resources in accordance with the recovery strategy.

5. The method of claim 4, wherein the recovery of the distributed service further comprising: constructing, by one or more processing units, dependencies among the retrieved at least one resource and the remaining resources in accordance with the recovery strategy.

6. The method of claim 5, wherein the recovery of the distributed service further comprising: restoring, by one or more processing units, configurations and status in accordance with the recovery strategy.

7. The method of claim 6, wherein the recovery of the distributed service further comprising: restoring, by one or more processing units, data in accordance with the recovery strategy.

8. A non-transitory computer program product comprising a computer readable storage medium having a computer readable program stored therein, wherein the computer readable program, when executed on a computing device, causes the computing device to:
  determine at least one missing resource of a distributed service based on a pre-defined service description responsive to a detection of a failure of the distributed service, wherein the pre-defined service description defines base elements for recovering the service;
  generate a recovery strategy based on the at least one missing resource;
  retrieve at least one resource in accordance with the recovery strategy; and
  recover the distributed service based on the retrieved at least one resource in accordance with the recovery strategy.

9. The computer program product of claim 8, wherein the computer readable program further causes the computing device to: initialize an incubator from remaining workable resources of the distributed service responsive to the determination of the at least one missing resource of the distributed service.

10. The computer program product of claim 9, wherein the computer readable program further causes the computing device to: add the retrieved at least one resource to the incubator responsive to the retrieval of the at least one resource.

11. The computer program product of claim 9, wherein the recovery of the distributed service comprises: orchestrating, by one or more processing units, deployment of the retrieved at least one resource with the remaining workable resources in accordance with the recovery strategy.

12. The computer program product of claim 11, wherein the recovery of the distributed service comprises: constructing, by one or more processing units, dependencies among the retrieved at least one resource and the remaining workable resources in accordance with the recovery strategy.

13. The computer program product of claim 12, wherein the recovery of the distributed service comprises: restoring, by one or more processing units, configurations and status in accordance with the recovery strategy.

14. The computer program product of claim 13, wherein the recovery of the distributed service comprises: restoring, by one or more processing units, data in accordance with the recovery strategy.

15. A computer-implemented system for automated recovery of a distributed service, comprising:
  one or more processing units;
  a memory coupled to the one or more processing units; and
  computer readable program stored in the memory, comprising:
    program code to determine at least one missing resource of the distributed service based on a pre-defined service description responsive to a detection of a failure of the distributed service, wherein the pre-defined service description defines base elements for recovering the service;
    program code to generate a recovery strategy based on the at least one missing resource;
    program code to retrieve at least one resource in accordance with the recovery strategy; and
    program code to recover the distributed service based on the retrieved at least one resource in accordance with the recovery strategy.

16. The computer-implemented system of claim 15, wherein the computer readable program further comprises:
  program code to initialize an incubator from remaining workable resources of the distributed service responsive to the determination of the at least one missing resource of the distributed service.

17. The computer-implemented system of claim 16, wherein the computer readable program further comprises:
  program code to add the retrieved at least one resource to the incubator responsive to the retrieval of the at least one resource.

18. The computer-implemented system of claim 16, wherein the computer readable program further comprises: program code to orchestrate deployment of the retrieved at least one resource with the remaining workable resources in accordance with the recovery strategy.

19. The computer-implemented system of claim 18, wherein the computer readable program further comprises: program code to construct dependencies among the retrieved at least one resource and the remaining workable resources in accordance with the recovery strategy.

20. The computer-implemented system of claim 19, wherein the computer readable program further comprises: program code to restore configurations and status in accordance with the recovery strategy.

21. The computer-implemented system of claim 20, wherein the computer readable program further comprises: program code to restore data in accordance with the recovery strategy.

* * * * *